(12) United States Patent
Flagg et al.

(10) Patent No.: US 9,266,181 B2
(45) Date of Patent: Feb. 23, 2016

(54) HEAD ASSEMBLY FOR MULTI-WIRE SUBMERGED ARC WELDING (SAW)

(71) Applicant: LINCOLN GLOBAL, INC., City of Industry, CA (US)

(72) Inventors: Michael S. Flagg, Aurora, OH (US); Clyde Stuble, North Royalton, OH (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 564 days.

(21) Appl. No.: 13/675,337

(22) Filed: Nov. 13, 2012

(65) Prior Publication Data
US 2014/0131323 A1    May 15, 2014

(51) Int. Cl.
*B23K 9/04* (2006.01)
*B23K 9/18* (2006.01)

(52) U.S. Cl.
CPC .. *B23K 9/04* (2013.01); *B23K 9/188* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,241,572 A * | 5/1941 | Armstrong | ............. | B23K 9/038 219/73 |
| 2,436,387 A * | 2/1948 | Harter | ................. | B23K 9/0678 219/124.5 |
| 3,342,973 A * | 9/1967 | Smith | ................. | B23K 9/0052 219/125.1 |
| 3,624,345 A * | 11/1971 | Armstrong | ............... | B23K 9/04 219/137 R |
| 3,719,579 A * | 3/1973 | Cross | ..................... | B23H 7/265 204/224 M |
| 3,729,609 A * | 4/1973 | Check | .................... | B23H 7/265 219/139 |
| 4,733,038 A | 3/1988 | Girardin | | |
| 4,896,012 A * | 1/1990 | Barbulescu | ............ | B23H 7/265 219/69.12 |
| 5,319,175 A | 6/1994 | Truty | | |
| 5,380,973 A | 1/1995 | Truty et al. | | |
| 5,430,268 A | 7/1995 | Truty et al. | | |
| 2010/0326963 A1 | 12/2010 | Peters et al. | | |

FOREIGN PATENT DOCUMENTS

CN             201415305 Y      3/2010

* cited by examiner

*Primary Examiner* — Dana Ross
*Assistant Examiner* — Renee L Miller
(74) *Attorney, Agent, or Firm* — Hahn Loeser & Parks LLP (57) ABSTRACT

The invention described herein generally pertains to a welding device that deposits a material onto a workpiece, the welding device having with an electrode head and a contact assembly coupled thereto. The contact assembly can include a rectangular-shaped first contact bar and a rectangular-shaped second contact bar that can be affixed to one another with an assembly connective means in order to encase a plurality of electrodes therebetween. The second contact bar can include a set of grooves in which each groove can correspond to an electrode to provide guidance during a welding procedure.

21 Claims, 10 Drawing Sheets

HEAD ASSEMBLY FOR MULTI-WIRE SUBMERGED ARC WELDING (SAW)

TECHNICAL FIELD

The invention described herein pertains generally to welding, and more particularly, to a head assembly for multi-wire Submerged Arc Welding (SAW).

BACKGROUND OF THE INVENTION

Metal parts frequently fail their intended use, due not only to fracturing but also to wear and abrasion, including mechanical wear (abrasion and pressure), chemical corrosion, and/or heat. Wear changes a metal part dimensionally and as such functionally. Processes are known for repairing worn metal parts where a durable material is adhered to the degraded surface. Similarly, a durable material may be adhered to a not previously worn surface which may be expected to experience wear. For metal components, this is commonly known as cladding or hard-facing, which can be defined as the application of building up wear-resistant material onto a parts surface by means of welding or joining. The cost of cladding is considerably less expensive than replacement costs and since cladding can be applied to a variety of base metals like: steel, stainless steel, nickel-based alloys, and copper-based alloys, it is widely used throughout the industry today.

A multi-wire SAW is a welding device that can perform cladding. The multi-wire SAW can include an electrode head that is adapted to receive a plurality of electrode contact tips. Each of the contacts tips may be associated with one of the electrodes. The contact tips can be releasably secured to the electrode head. For instance, conventional multi-wire SAW welding devices include an electrode head with apertures adapted to securely receive each of the contact tips respectively. Most conventional techniques include threads within the apertures as well as include corresponding threads on the contact tips for insertion into and removal from the electrode head as needed. Other techniques include set screws that, when tightened, prevent the contact tips from unintentionally dislodging.

Contact tips can wear in a short duration of time during cladding welding operations. When the contact tips wear out or deteriorate, new contact tips can be used for replacement tips. Replacing or repairing individual contact tips can be a cumbersome and timely maintenance procedure based on a location within or on the electrode head as well as the type of attachment to the electrode head (e.g., individual threads on contact tips, among others). Often, a contact tip holder can be used to hold a plurality of contact tips in place (rather than each tip using a releasably secure mechanism). However, each time a contact tip is replaced, the nozzle of the welding device is lifted to gain access to the contact tips. Such procedure often increases downtime and decreases operational productivity for a welding device that performs cladding operations.

Techniques and mechanisms for changing contact tips in an electrode head for a welding device can be time-consuming due to the location of the contact tips or the type of attachment to the electrode head. Moreover, replacement of contact tips can often require movement of the nozzle of the welding device which can be time-consuming and decrease the accuracy of the cladding operation. What is needed is a time efficient and non-evasive technique or mechanism that facilitates replacement of contact tips used by a welding device.

SUMMARY OF THE INVENTION

In accordance with the present invention, there is provided for deposition of material onto an associated workpiece resulting from the flow of electrical current through a plurality of associated continuous feed electrodes, comprising the steps of: providing a welding device that includes an electrode head adapted to concurrently house an array of associated multiple, continuous-feed electrodes in a spaced apart configuration for concurrently depositing material on the surface of the associated workpiece, the electrode head includes a plurality of apertures adapted to receive the associated multiple, continuous-feed electrodes, a contact assembly coupled to the electrode head and adapted to receive the associated multiple, continuous-feed electrodes. The contact assembly includes a first contact bar that is rectangular-shaped and a second contact bar that is rectangular-shaped, the second contact bar includes a first flat side that includes a first set of grooves in which a groove of the set corresponds to one of the associated multiple, continuous-feed electrodes, the first contact bar includes a first flat side, and an assembly connective means affixing the first contact bar to the second bar, wherein the first flat side of the second contact bar contacts the first flat side of the first contact bar encasing each of the associated multiple, continuous-feed electrodes between the first contact bar and the second contact bar within a respective groove of the set of grooves.

In accordance with the present invention, there is provided a welding device for depositing material on a surface of an associated workpiece, comprising: an electrode head adapted to concurrently house an array of associated multiple, continuous-feed electrodes in a spaced apart configuration for concurrently depositing material on the surface of the associated workpiece, the electrode head includes a plurality of apertures adapted to receive the associated multiple, continuous-feed electrodes, a contact assembly coupled to the electrode head and adapted to receive the associated multiple, continuous-feed electrodes. The contact assembly can include a first contact bar that is rectangular-shaped and a second contact bar that is rectangular-shaped, the second contact bar includes a first flat side that includes a first set of grooves in which a groove of the set corresponds to one of the associated multiple, continuous-feed electrodes, the first contact bar includes a first flat side, and an assembly connective means affixing the first contact bar to the second bar, wherein the first flat side of the second contact bar contacts the first flat side of the first contact bar encasing each of the associated multiple, continuous-feed electrodes between the first contact bar and the second contact bar within a respective groove of the set of grooves.

In accordance with the present invention, there is provided an electrode head for a welding machine having one or more welding power sources and one or more electrode drives, comprising: an electrode head body having a plurality of apertures adapted to convey a plurality of associated continuous feed electrodes for depositing material onto an associated workpiece, a contact assembly adapted to receive the plurality of associated continuous feed electrodes for establishing respective welding arcs, wherein the contact assembly is adapted to fixedly attach to the electrode head body. The contact assembly includes a first contact bar that is rectangular-shaped and a second contact bar that is rectangular-shaped, the second contact bar includes a first flat side that includes a first set of grooves in which a groove of the set corresponds to one of the associated multiple, continuous-feed electrodes, the first contact bar includes a first flat side, and an assembly connective means affixing the first contact bar to the second bar, wherein the first flat side of the second contact bar contacts the first flat side of the first contact bar encasing each of the associated multiple, continuous-feed electrodes between the first contact bar and the second contact bar within a respective grooved channel of the set of grooves.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 1-14 illustrate contact assembly 10 for welding device 100. It is envisioned that device 100 may typically be used to clad or hard-face a workpiece by a submerged arc or electroslag welding process, although other welding processes such as GMAW, FCAW, TIG, and laser welding may also be employed. Cladding or hard-facing may be defined as a process by which cladding material is adhered to the surface of an existing component, known as a substrate or workpiece. The process bonds or infuses the cladding material or filler wire, which may be harder than the component material. In this manner, the cladding material comprises a wear resistant surface and a barrier to abrasion, erosion and heat during use.

Figure 1:
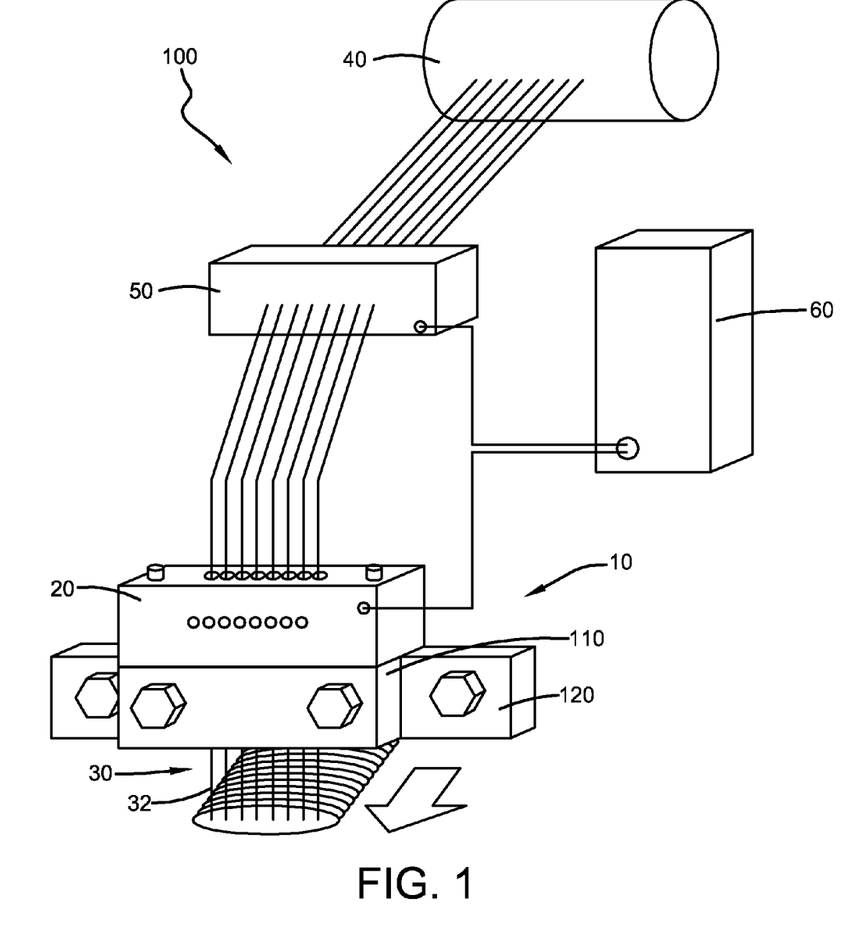
FIG. 1 is a perspective view of a welding device used to deposit a material on a workpiece.

As illustrated in FIG. 1, welding device 100 includes contact assembly 10 coupled to electrode head 20, wherein electrode head 20 concurrently houses array 30 of multiple, continuous-feed electrodes 32. Electrodes 32 may be gas-shielded, self-shielded, or metal cored. These electrodes may be solid core, metal core, or flux cored wires, to be used under gas shielding, under a submerged arc flux, or in an electroslag process. In the instance of cored electrodes, it is contemplated that the electrode sheath may be carbon steel, stainless steel, or a nickel alloy. Electrode head 20 houses array 30 such that electrodes 32 are in a spaced apart configuration for concurrently depositing material on a surface of an associated workpiece. Electrode head 20 may further include plurality of apertures 130 (better illustrated in FIG. 3) to receive multiple, continuous-feed electrodes 32. Electrodes 32 may be provided from coil 40. Coil 40 may include a plurality of individual coils, each coil containing a single electrode, which are arranged along a common axis of rotation. Still any manner of delivering filler wire or cladding material may be chosen without departing from the intended scope of coverage of the embodiments of the subject invention. In an embodiment, electrode head 20 can include an additional set of a plurality of apertures 190 (better illustrated in FIG. 3) on a disparate side (in comparison to the plurality of apertures 130) of electrode head 20. For instance, plurality of apertures 130 can correspond to a gauge(s) (e.g., thickness) of electrode(s), whereas plurality of apertures 190 can correspond to a different gauge(s) (e.g., thickness) of electrode(s). For example, plurality of apertures 130 can correspond to 0.045 inch wire (e.g., electrodes) and plurality of apertures 190 can correspond to 1/16 inch wire (e.g., electrodes). Still, other gauges for each set of apertures 130, 190 be employed with sound engineering judgment without departing from the intended scope of coverage of the embodiments of the subject invention.

As illustrated in FIG. 1, contact assembly 10 is coupled to electrode head 20 and adapted to receive array 30 of associated multiple, continuous-feed electrodes 32. Contact assembly 10 replaces conventional techniques and mechanisms associated with contact tips. Rather than an individual contact tip for each of the continuous-feed electrodes 32, contact assembly 10 provides a universal housing that collectively encases each electrode 32. Moreover, contact assembly 10, as discussed in more detail below, allows access to electrodes and such housing without movement of a nozzle on welding device 100.

Welding device 100 includes means for concurrently driving array 30 of electrodes 32 through electrode head 20. It is envisioned that the means for driving includes plurality of drive rolls 50 or other wire feeder device. Each of the plurality of drive rolls 50 may be associated with one or more of electrodes 32. In one aspect, two electrodes 32 may be associated with a single set of drive rolls 50, although it is envisioned that the relationship between the number of electrodes and the number of wire feeders may be configured such that any number of electrodes may be associated with a single set of drive rolls as appropriate in a cladding process without departing from the intent of the subject disclosure. In one example, drive rolls 50 may be configured to drive electrodes 32 through the electrode head 20 at substantially the same rate. Alternatively, drive rolls 50 are configured to feed electrodes 32 at slower and/or faster wire speeds/wire feed rates, where it may be desired to change the current needed to melt off the electrode, thereby changing the heat input by electrode 32 into the molten cladding material. For example, one set of drive rolls 50 may be configured to feed electrodes 32 arranged at the outside of array 30 at a one wire feed speed, while a different set of drive rolls 50 may be configured to feed electrodes 32 arranged at the inside of array 30 at a relatively lower wire feed speed as compared to the wire feed speed of the outer electrodes, so as to substantially reduce and/or eliminate the effects of the magnetic force induced by the flow of current through each electrode 32.

In one aspect of the embodiments of the subject invention, each of the electrodes 32 are configured to be connected to welding power source 60. That is to say that during the cladding process, for instance, welding power can be delivered through each of electrodes 32 in array 30 at substantially the same rate. Accordingly, cladding material is delivered substantially uniformly over a width of electrode head 20. Uniform penetration of the substrate is also achieved. As indicated above, power may be delivered from the welding power source 60 through welding cables (not shown) as attached at one end to studs (not shown). At the distal end, welding cables may be connected to electrode head 20 through an electrode head connector. In the exemplary case of a single welding power source 60, a single electrode head connector may convey power from the welding cables commonly to contact assembly 10 affixed to electrode head 20. Still, other means for conveying power from the welding cables to electrode head 20 may be employed with sound engineering judgment.

FIGS. 1-14 illustrate contact assembly 10 for performing a welding operation. In one aspect, contact assembly 10 includes first contact bar 110 and second contact bar 120. Contact bars 110, 120 are often rectangular-shaped. Furthermore, contact bars 110, 120 include a length, a width, and a depth (e.g., a thickness). In an embodiment, first contact bar 110 is substantially similar in size and/or shape to second contact bar 120. In another embodiment, first contact bar 110 includes a first length and second contact bar 120 include a second length, where the first length is less than the second length. Additionally, first contact bar 110 can include a substantially similar width and/or depth (e.g., thickness). In another embodiment, first contact bar 110 is constructed from a material selected from the group consisting of a copper, an alloy of copper, beryllium copper, copper tungsten, a conductive metal, among others. In yet another embodiment, second contact bar 120 can be constructed from a material selected from the group consisting of a steel, a copper, a ceramic, among others. Yet, any shape, size, dimensions, or material may be chosen with sound engineering judgment without departing from the intended scope of coverage of the embodiments of the subject invention.

As illustrated in FIGS. 2-8, one embodiment includes contact bars 110, 120 each being rectangular-shaped. First contact bar 110 includes first flat side 112 parallel to a second flat side (opposite thereof) and includes a thickness with at least four (4) sides interconnecting first flat side 112 and the second flat side opposite thereof. Second contact bar 120 includes first flat side 114 parallel to a second flat side (opposite thereof) and includes a thickness with at least four (4) sides interconnecting first flat side 114 and the second flat side opposite thereof.

Figure 6:
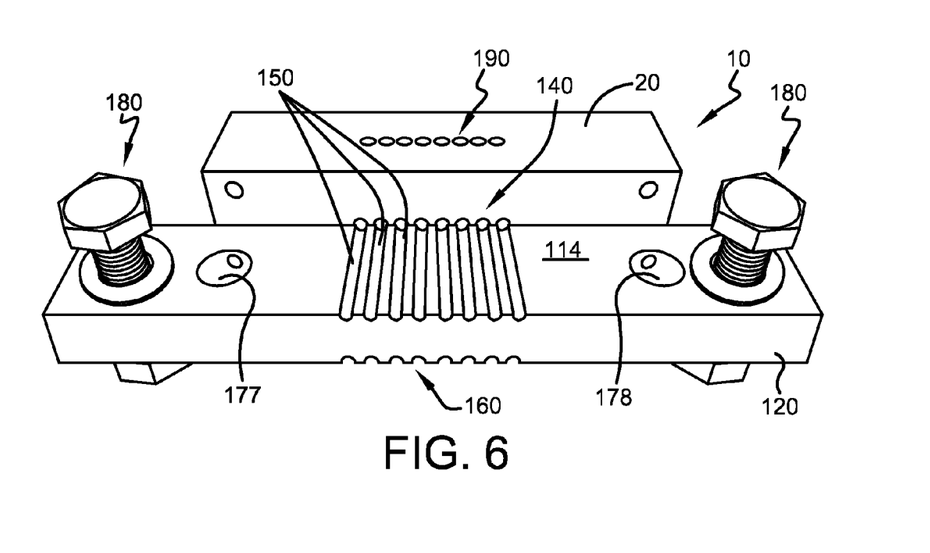
FIG. 6 is a bottom, front perspective view of the contact assembly with the first contact bar not affixed to the second contact bar.
Figure 7:
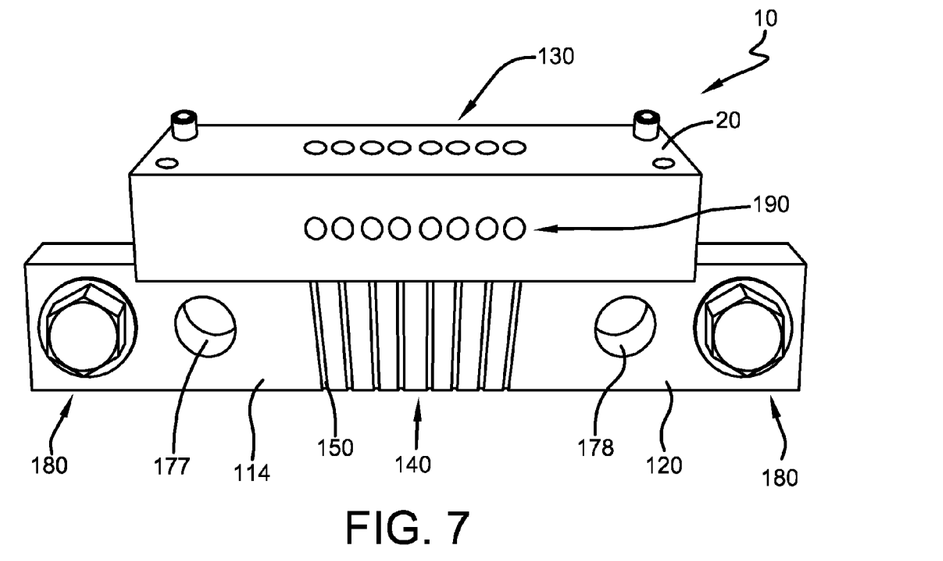
FIG. 7 is a front perspective view of the contact assembly with the first contact bar not affixed to the second contact bar.
Figure 8:
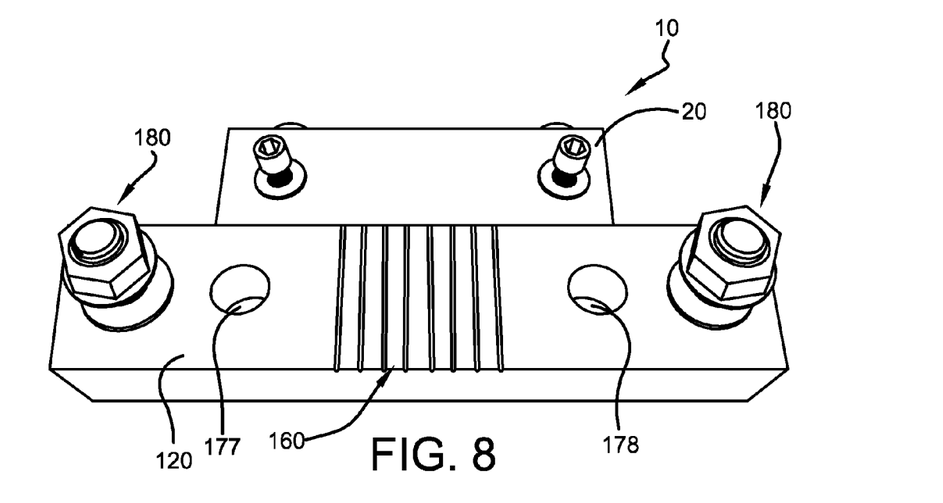
FIG. 8 is a back perspective view of the contact assembly with the first contact bar not affixed to the second contact bar.
Figure 9:
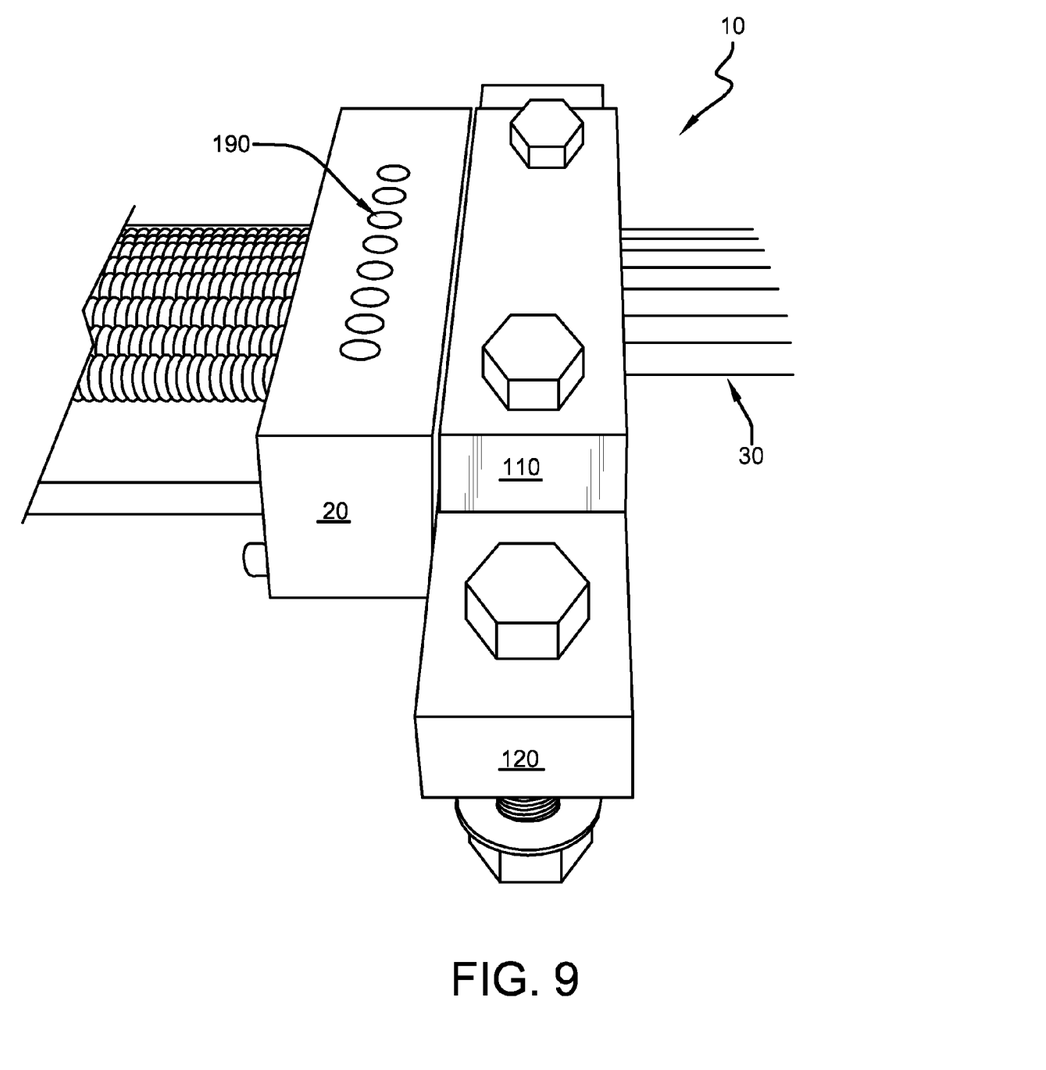
FIG. 9 is a side perspective view of the contact assembly.
Figure 10:
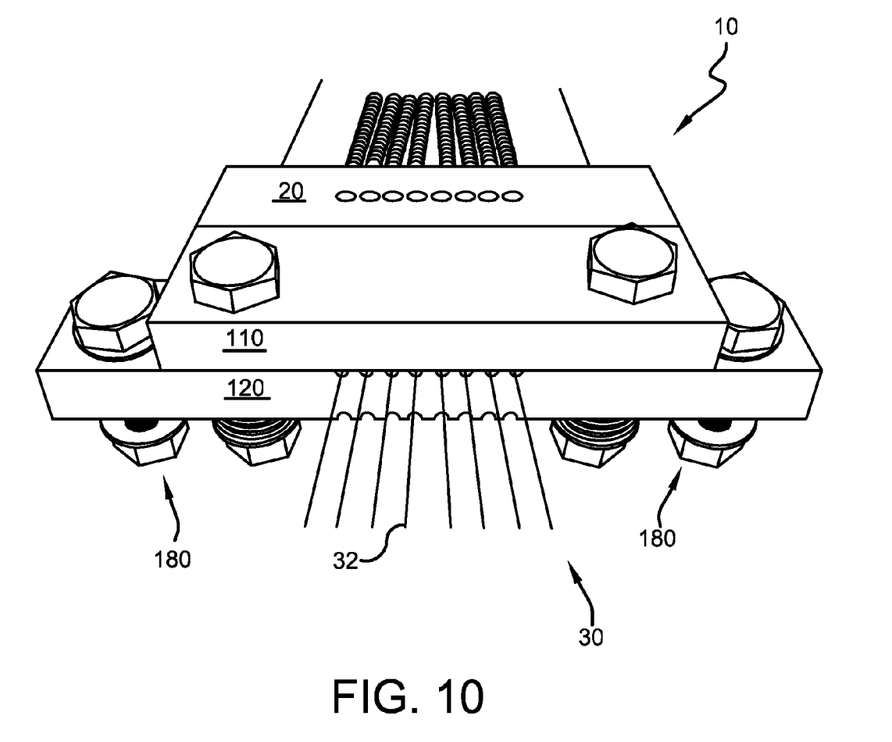
FIG. 10 is a bottom, front perspective view of the contact assembly.
Figure 11:
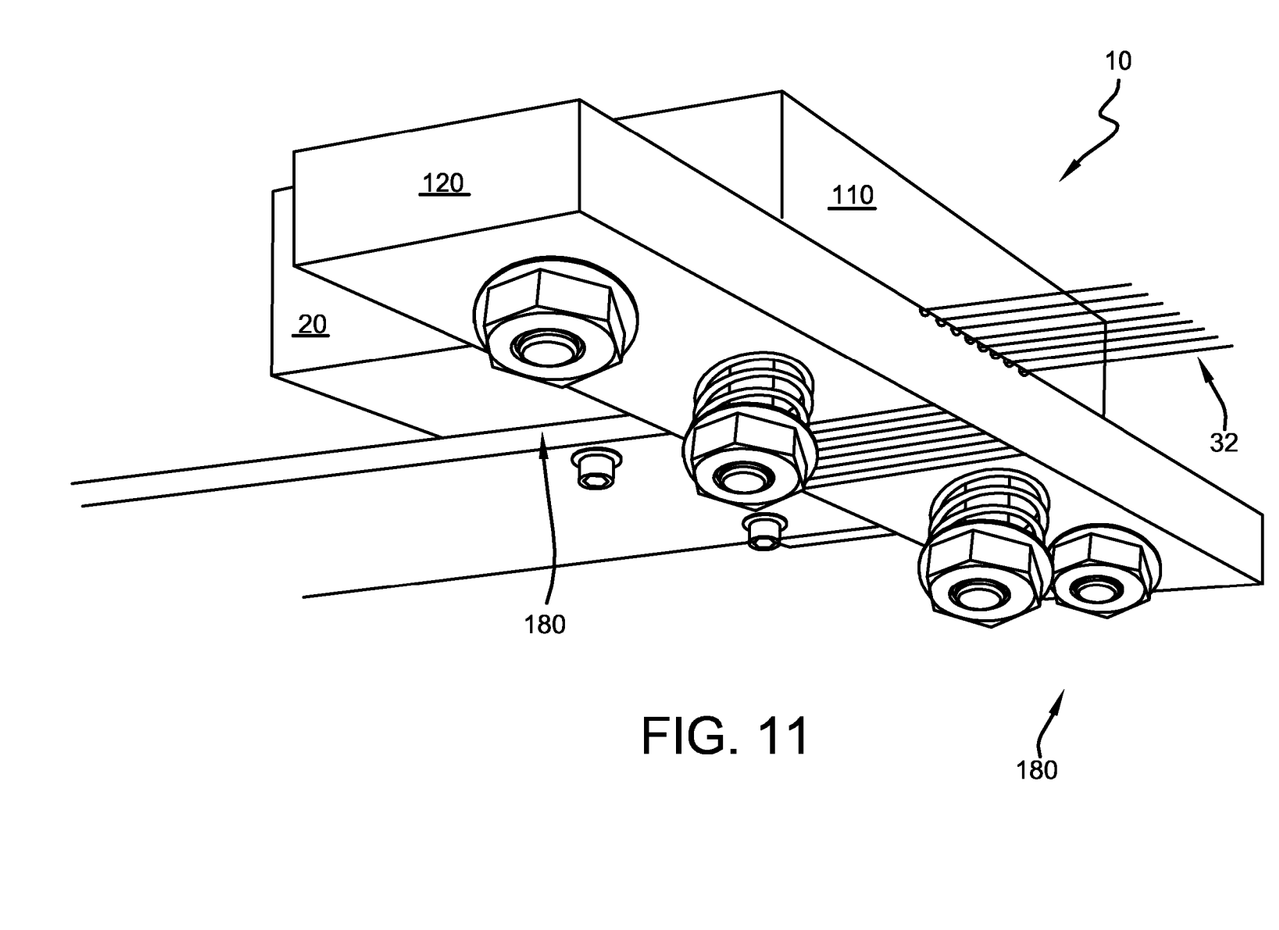
FIG. 11 is a bottom, side perspective view of the contact assembly.

Moreover, first contact bar 110 includes first flat side 112 (illustrated in FIG. 4), and second contact bar 120 can include flat side 114 (illustrated in FIG. 6). First flat side 112 and first flat side 114 are in contact based on assembly connective means 170. In an embodiment, first flat side 112 and first flat side 114 are within a distance of one another such that the electrodes 32 are wedged therebetween, wherein the distance is in the range of zero (0) (e.g., tight and in contact) to approximately half a diameter of the electrode 32. For instance, an electrode gauge of 0.045 can have a distance from zero (0) to 0.023 inches. Yet, as first contact bar 110 and second contact bar 120 wear, the distance is reduced to zero which enables contact between first contact bar 110 and second contact bar 120. In another embodiment, first contact bar 110 includes a second flat side opposite and parallel of first flat side 112 on first contact bar 110. In still another embodiment, second contact bar 120 includes a second flat side opposite and parallel of first flat side 114 on second contact bar 120.

In an embodiment, second contact bar 120 includes first flat side 114 that includes at least one groove 150 (where one or more grooves are referred to as set of grooves 140). For instance, a groove can correspond to each of associated multiple, continuous-feed electrodes 32. In another instance, a width of groove 150 corresponds to a thickness of a corresponding continuous-feed electrode 32 in which groove 150 of the set corresponds to one of associated multiple, continuous-feed electrodes 32. For example, each groove 150 includes a width that is approximate to a diameter for at least one of associated multiple, continuous-feed electrodes 32.

In still another embodiment, second contact bar 120 includes second set of grooves 160 (e.g., an extra set of grooves) on a side opposite of first flat side 114 on second contact bar 120 (e.g., the side opposite of first flat side 114 on second contact bar 120 can be referred to as a second flat side). Second set of grooves 160 can correspond to a second width or thickness related to a diameter of electrodes 32. For example, each groove of the set of grooves 160 can include a width that is approximate to a diameter for at least one of associated multiple, continuous-feed electrodes 32. Any width or electrode diameter (e.g., gauge) may be chosen with sound engineering judgment without departing from the intended scope of coverage of the embodiments of the subject invention.

Contact assembly 10 can further include assembly connective means 170 affixing first contact bar 110 to second contact bar 120. Assembly connective means 170 connects first contact bar 110 to second contact bar 120, wherein first flat side 114 of second contact bar 120 is in contact with first flat side 112 of first contact bar 110. Contact and connection between first contact bar 110 and second contact bar 120 can encase each of associated multiple, continuous-feed electrodes 32 between first contact bar 110 and second contact bar 120 within a respective groove 150 of set of grooves 140.

Figure 4:
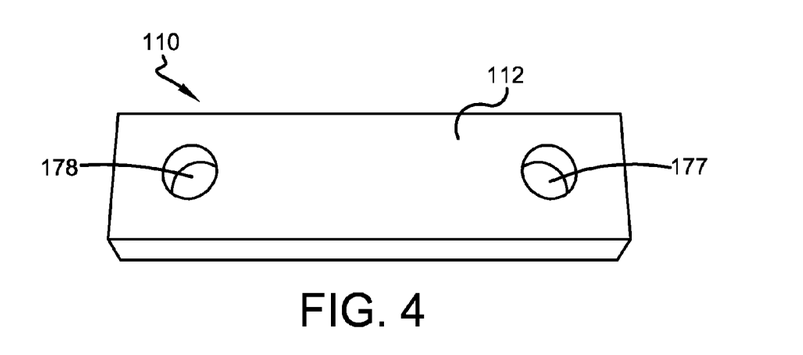
FIG. 4 is a perspective view of a first contact bar for the contact assembly.
Figure 5:
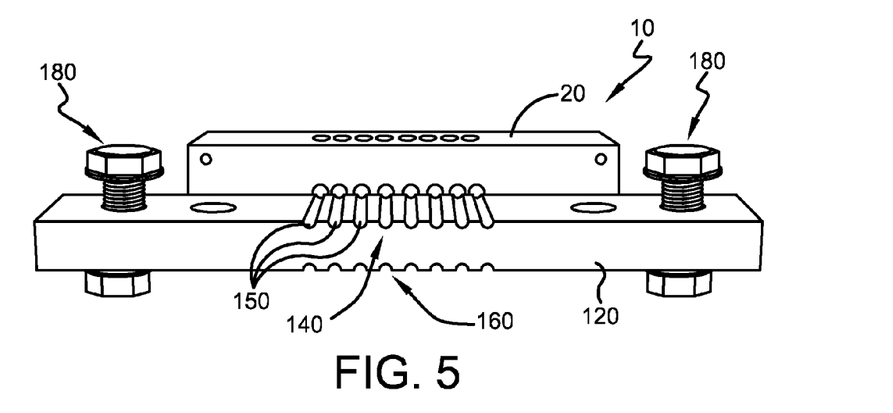
FIG. 5 is a bottom perspective view of the contact assembly with the first contact bar not affixed to the second contact bar.

In an embodiment, assembly connective means 170 includes a pressure-spring clamp mechanism that secures associated multiple, continuous-feed electrodes 32 in between first contact bar 110 and second contact bar 120. For example, assembly connective means 170 can include at least one bolt, nut, washer, and spring. By way of example and not limitation, contact assembly 10 is illustrated with assembly connective means 170 as a bolt, a spring, and/or a nut. As illustrated in FIG. 4, first aperture 177 is included on one end of each first contact bar 110 and second contact bar 120 such that first aperture 177 aligns with both first contact bar 110 and second contact bar 120. Moreover, second aperture 178 is included on an opposite end of the one end such that second aperture 178 aligns with both first contact bar 110 and second contact bar 120. At least one bolt assembly can be used to affix first contact bar 110 to second contact bar 120, wherein the at least one bolt assembly can include a bolt, a spring, and a nut.

Figure 2:
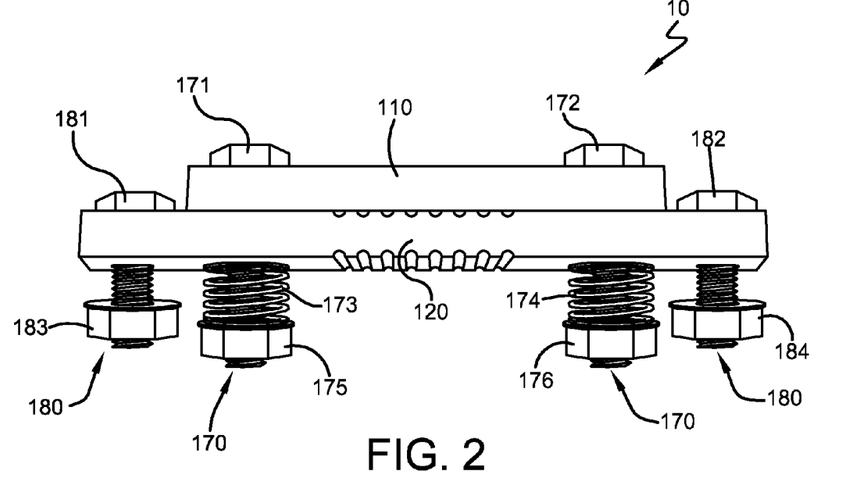
FIG. 2 is a bottom perspective view of a contact assembly coupled to an electrode head for a welding device.

In an embodiment, the bolt assembly for first aperture 177 can include bolt 171, spring 173, and nut 175 (as shown in FIG. 2). In an embodiment, the bolt assembly for second aperture 178 can include bolt 172, spring 174, and nut 176 (as shown in FIG. 2). Still, other means for affixing first contact bar 110 to contact bar 120 may be chosen with sound engineering judgment without departing from the intended scope of coverage of the embodiments of the subject invention.

Contact assembly 10 can include welder device connective means 180. As shown in FIGS. 2-8 and FIGS. 10-12, welder device connective means 180 can couple contact assembly 10 to welding device 100. In an embodiment, welder device connective means 180 can be a bolt assembly that includes a bolt, a washer (optional), a nut, and an aperture for which the bolt assembly can be inserted. For instance, a bolt assembly can be used on each end of second contact bar 120 (e.g., one bolt assembly for each end) to connect contact assembly 10 to welding device 100. Still, other means for affixing contact assembly 10 may be chosen with sound engineering judgment without departing from the intended scope of coverage of the embodiments of the subject invention.

In an embodiment, assembly connective means 170 can be utilized to affix first contact bar 110 to second contact bar 120 as well as to couple contact assembly 10 to welding device 100. In a particular embodiment, assembly connective means 170 (e.g., bolt assembly, among others) can couple contact assembly 10 to welding device 100 and, in addition, affix first contact bar 110 to second contact bar 120.

Figure 12:
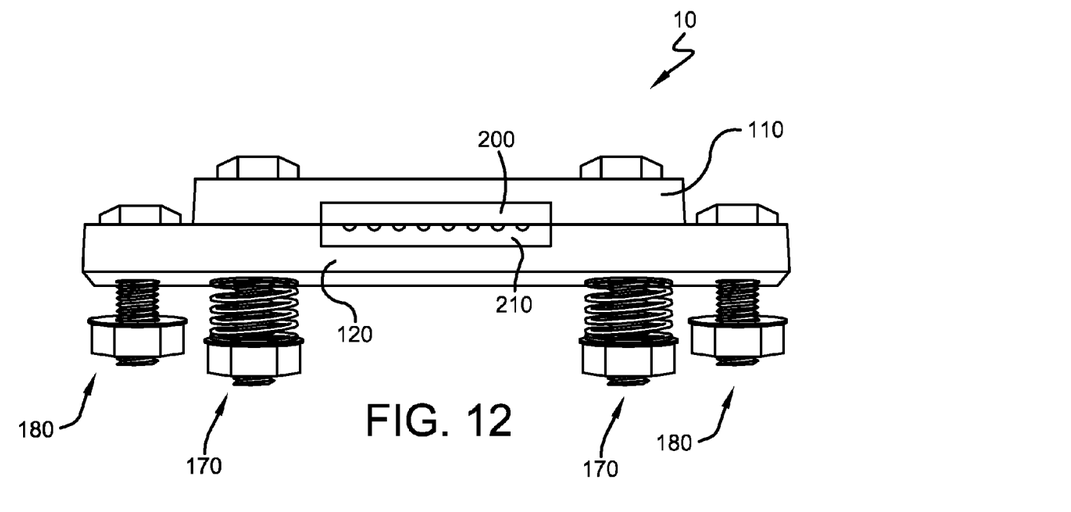
FIG. 12 is a bottom perspective view of the contact assembly that includes one or more inserts.
Figure 13:
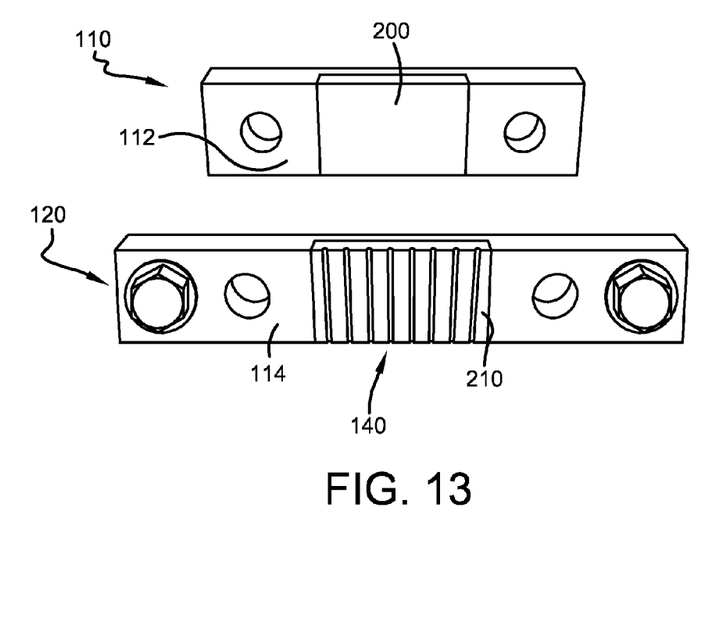
FIG. 13 is a perspective view of the contact assembly that includes inserts in the first contact bar and/or the second contact bar.
Figure 14:
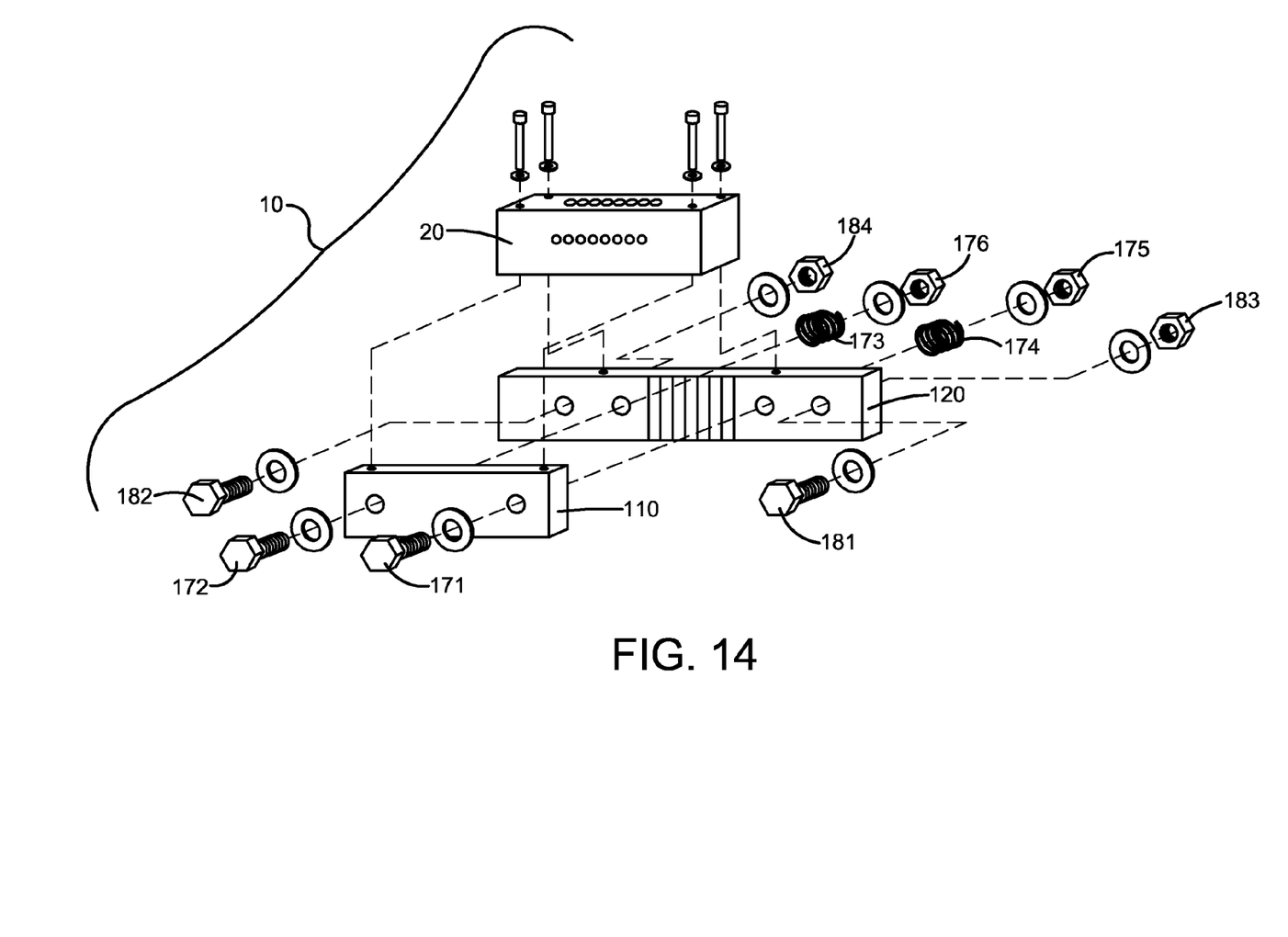
FIG. 14 is an exploded view of the contact assembly.
Figure 15:
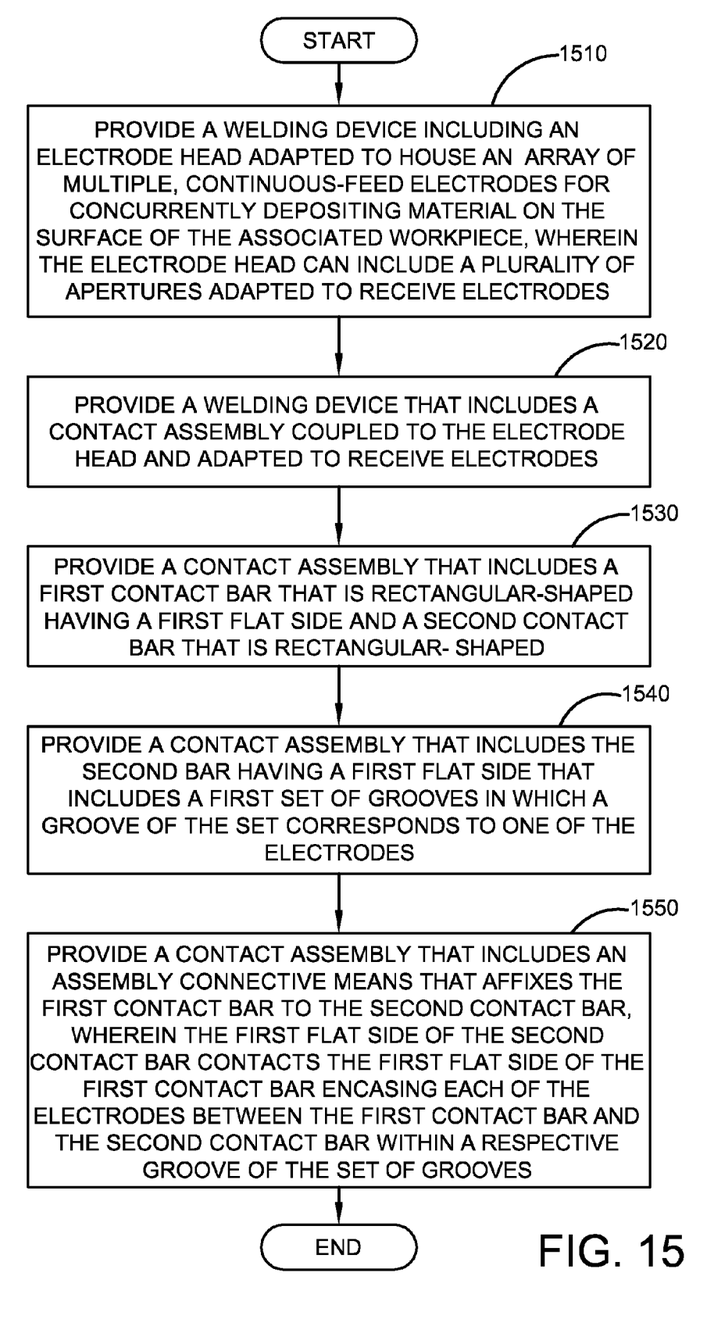
FIG. 15 is a flow diagram of providing a welding device that includes a contact assembly.

In an embodiment, first contact bar 110 can include insert 200 (as shown in FIGS. 12-13). Insert 200 can provide an additional resistance to wear from electrodes sliding therebetween or thereby based on being constructed from first material while first contact bar 110 is construction from a second material. In another example, insert 200 can be constructed from a conductive material so as to reduce cost by using a less amount of expensive conductive materials (e.g., conductive material for insert 200 rather than entire first contact bar 110). Insert 200 can be incorporated into first contact bar 110 such that insert 200 can include a depth (e.g., thickness), a length, and a width. In an embodiment, insert 200 includes a length that is less than or equal to a length of first contact bar 110, a width that is less than or equal to a width for first contact bar 110, and a depth (e.g., thickness) that is less than a depth for first contact bar 110. By way of example and not limitation, insert 200 includes a surface area for a surface (e.g., surface that is in contact with first flat side 114 of second contact bar 120) that is greater than or equal to a surface area on a surface that includes set of grooves 140. For instance, if the set of grooves span for a length of 5 inches and has a width of 5 inches on a second contact bar and second contact bar has with a length of 10 inches and a 5 inch width, the surface area for insert 200 can be equal to or greater than 25 square inches (e.g., surface area needed for a space of the set of grooves is 5 inches×5 inches=25 square inches). It is to be appreciated that insert 200 can provide a material different from first contact bar 110 to prevent wear and/or deterioration for electrodes 32 encased within set of grooves 140. Further, it is to be appreciated and understood that insert 200 can be constructed from a first material and first contact bar 110 can be constructed from a second material.

In another embodiment, second contact bar 120 can include insert 210 (shown in FIGS. 12-13). Insert 210 can provide an additional resistance to wear from depositing material on the workpiece based on construction from first material while second contact bar 120 is construction from a second material. In another example, insert 210 can be constructed from a conductive material so as to reduce cost by using a less amount of expensive conductive materials (e.g., conductive material for insert 210 rather than entire second contact bar 120). Insert 210 can be incorporated into second contact bar 120 such that insert 210 includes a depth (e.g., thickness), a length, and a width. In another embodiment, insert 210 includes a length that is less than or equal to a length of second contact bar 120, a width that is less than or equal to a width for second contact bar 120, and a depth (e.g., thickness) that is less than a depth for second contact bar 120. By way of example and not limitation, insert 210 includes a surface area for a surface (e.g., surface that is in contact with first flat side 112 of first contact bar 110) that is greater than or equal to a surface area needed to span or include set of grooves 140. For instance, if the set of grooves span for a length of 5 inches and has a width of 5 inches on a second contact bar and second contact bar has with a length of 10 inches and a 5 inch width, the surface area for insert 210 can be equal to or greater than 25 square inches (e.g., surface area needed for a space of the set of grooves is 5 inches×5 inches=25 square inches). Further, second contact bar 120 includes set of grooves 140 on first flat side 114, yet insert 210 can include a first flat side and include set of grooves 140 thereon. It is to be appreciated that insert 210 can provide a material that is different from second contact bar 120 to prevent wear and/or deterioration for electrodes 32 encased within set of grooves 140 as well as an electrical conductor for electrodes 32. Further, it is to be appreciated and understood that insert 210 can be constructed from a first material and second contact bar 120 can be constructed from a second material.

In another embodiment, first contact bar 110 includes first insert 200 (also referred to as insert 200) and second contact bar 120 includes second insert 210 (also referred to as insert 210). First insert 200 is incorporated into first contact bar 110 and second insert 210 is incorporated into second contact bar 120. First insert 200 has a depth (e.g., thickness), a length, and a width and second insert 210 has a depth (e.g., thickness), a length, and a width. In an embodiment, first insert 200 includes a length that is less than or equal to a length of first contact bar 110, a width that is less than or equal to a width for first contact bar 110, and a depth (e.g., thickness) that is less than a depth for first contact bar 110. In another embodiment, second insert 210 includes a length that is less than or equal to a length of second contact bar 120, a width that is less than or equal to a width for second contact bar 120, and a depth (e.g., thickness) that is less than a depth for second contact bar 120.

By way of example and not limitation, first insert 200 and second insert 210 can include respective surface areas (e.g., first flat side 112 and first flat side 114, surfaces in contact, and the like) that are approximate in dimensions to each other. In another example, the respective surface areas for first insert 200 and second insert 210 can be equal to or greater than a surface area associated with set of grooves 140 (or in the alternative set of grooves 160). In an embodiment, the respective surface areas for first insert 200 and second insert 210 cover a surface area accounting for electrodes 32 encased between first contact bar 110 and second contact bar 120. For instance, inserts 200, 210 are sized to a surface area that includes set of grooves 140.

In a particular embodiment, insert 200 is constructed from a material selected from the group consisting of a copper, an alloy of copper, beryllium copper, copper tungsten, a conductive metal, among others, whereas first contact bar 110 is constructed from a material selected from the group consisting of a steel, a copper, a ceramic, among others. In such embodiment, second contact bar 120 is constructed from a material selected from the group consisting of a steel, a copper, a ceramic, among others.

In a particular embodiment, insert 210 is constructed from a material selected from the group consisting of a copper, an alloy of copper, beryllium copper, copper tungsten, a conductive metal, among others, whereas second contact bar 120 is constructed from a material selected from the group consisting of a steel, a copper, a ceramic, among others. In such embodiment, first contact bar 110 is constructed from a material selected from the group consisting of a steel, a copper, a ceramic, among others.

In a particular embodiment, first insert 200 is constructed from a material selected from the group consisting of a copper, an alloy of copper, beryllium copper, copper tungsten, a conductive metal, among others, first contact bar 110 is constructed from a material selected from the group consisting of a steel, a copper, a ceramic, among others, second insert 210 is constructed from a material selected from the group consisting of a copper, an alloy of copper, beryllium copper, copper tungsten, a conductive metal, among others, and second contact bar 120 is constructed from a material selected from the group consisting of a steel, a copper, a ceramic, among others.

By way of example and not limitation, insert 200 can be incorporated into or onto first contact bar 110 with at least one of a fastener, a press-fit, a friction fit, among others. Still, other means for incorporating insert 200 into or onto first contact bar 110 may be chosen with sound engineering judgment without departing from the intended scope of coverage of the embodiments of the subject invention. By way of example and not limitation, insert 210 can be incorporated into or onto second contact bar 120 with at least one of a fastener, a press-fit, a friction fit, among others. Still, other means for incorporating insert 210 into or onto second contact bar 120 may be chosen with sound engineering judgment without departing from the intended scope of coverage of the embodiments of the subject invention.

Figure 3:
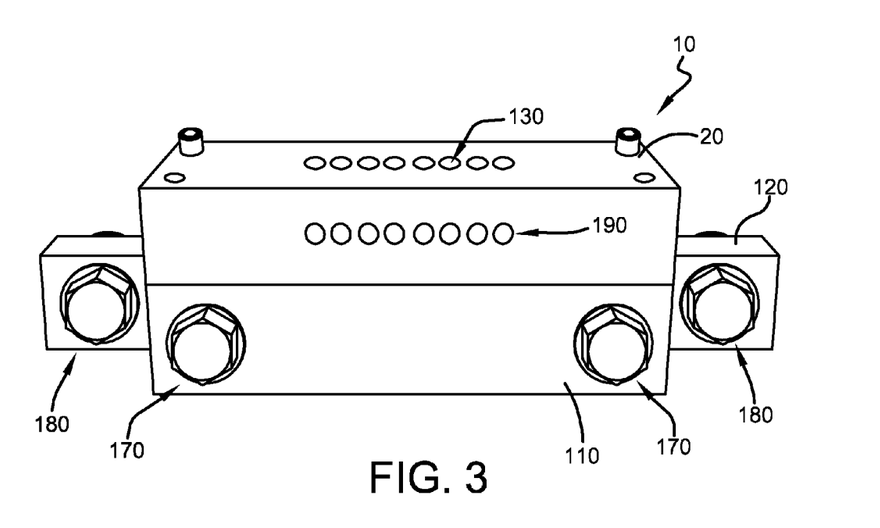
FIG. 3 is a top, front perspective view of the contact assembly used for a welding device.

First contact bar 110 can be affixed to second contact bar 120 with assembly connective means 170 as shown in FIGS. 2, 3, and 12. In particular, assembly connective means 170 provide a spring-like mechanism in order to apply an even pressure or force on electrodes 32 encased between first contact bar 110 and second contact bar 120 and respectively positioned in each groove 150. Moreover, contact assembly 10 is coupled to welding device 100 with welder device connective means 180. As shown in FIGS. 2, 3, and 12, assembly connective means 170 facilitates performing maintenance repairs on contact assembly 10 without removing electrodes 32 from respective grooves 150 from set of grooves 140 and/or lifting a nozzle of welding device 100.

As discussed above, first contact bar 110 is essentially rectangular-shaped with first flat side 112 and a second flat side opposite of first flat side 112, wherein first flat side 112 is parallel to second flat side. Second contact bar 120 is essentially rectangular-shaped with first flat side 114 and a second flat side opposite of first flat side 112, wherein first flat side 114 is parallel to second flat side. Still, other shapes or sizes for first contact bar 110 and/or second contact bar 120 may be chosen with sound engineering judgment without departing from the intended scope of coverage of the embodiments of the subject invention. First flat side 112 and second flat side opposite thereof includes a thickness and at least four (4) sides interconnecting first flat side 112 and the second flat side opposite thereof. The rectangular-shaped first contact bar 110 allows a rotation thereof about an axis in order to provide one of the sides in contact (e.g., first flat side 112, first flat side 114, and the like) with second contact bar 120 and in particular, set of grooves 140. For instance, contact bar 110 includes first flat side 112 (and an edge) in contact with first flat side 114 of second contact bar 120 and a rotation (e.g., a half rotation, among others) of first contact bar 110 about a longitudinal axis can provide the second flat side (and a respective edge) opposite of the first flat side 112 in contact with first flat side 114 of second contact bar 120. Similarly, contact bar 110 can include first flat side 112 (and an edge) in contact with first flat side 114 of second contact bar 120 and a rotation (e.g., a half revolution, among others) of first contact bar 110 about a latitudinal axis can provide the second flat side (and a respective edge) opposite of the first flat side 112 in contact with first flat side 114 of second contact bar 120. For instance, an edge on first contact bar 110 on first flat side 112 can be worn from use with depositing material in a welding operation with contact assembly 10. The first contact bar 110 can be rotated about a longitudinal axis to provide a fresh (unworn) edge to contact second contact bar 120 and/or first contact bar 110 can be rotated about a latitudinal axis to provide a fresh (unworn) edge to contact second contact bar 120. It is to be appreciated that a combination of rotation about both the latitudinal axis and the longitudinal axis can be used to access each edge or side of first contact bar 110.

With reference to all of the FIGS. 1-14, method 1500 is a flow diagram of depositing cladding material onto an associated workpiece resulting from the flow of electrical current through a plurality of associated continuous feed electrodes is illustrated. Method 1500 may include the steps of providing a welding device including an electrode head adapted to house an array of multiple, continuous-feed electrodes for concurrently depositing material on the surface of the associated workpiece, wherein the electrode head can include a plurality of apertures adapted to receive electrodes (reference block 1510). The provided welding device further includes a contact assembly coupled to the electrode head receives electrodes (reference block 1520). The contact assembly is provided that further includes a first contact bar that is rectangular-shaped having a first flat side and a second contact bar that is rectangular-shaped (reference block 1530). Contact assembly can be provided that further includes the second contact bar having a first flat side that includes a first set of grooves in which a groove of the set corresponds to one of the electrodes (reference block 1540). Contact assembly is provided that includes an assembly connective means that affixes the first contact bar to the second contact bar, wherein the first flat side of the second contact bar contacts the first flat side of the first contact bar encasing each of the electrodes between the first contact bar and the second contact bar within a respective groove of the set of grooves (reference block 1550).

In an embodiment, the method can further include establishing a welding arc between each of the associated multiple, continuous-feed electrodes and the associated workpiece for depositing material onto the surface of the associated workpiece. In another embodiment, the method can include at least one of rotating the first contact bar about a longitudinal axis for half a revolution, the rotation relieves an edge on the first contact bar that is worn from deposition of material onto an associated workpiece (e.g., rotation of the first contact bar presents an unworn edge or an edge that has not been used in the welding operation), or rotating the first contact bar about a latitudinal axis for half a revolution, the rotation relieves an edge on the first contact bar that is worn from deposition of material onto an associated workpiece (e.g., rotation of the first contact bar presents an unworn edge or an edge that has not been used in the welding operation). In an embodiment, the method can further include grinding a portion of the first contact bar to remove wear from deposition of material onto the associated workpiece.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welding device for depositing material on a surface of an associated workpiece, comprising:
   an electrode head adapted to concurrently house an array of associated multiple, continuous-feed electrodes that are consumable in a spaced apart configuration to which current is applied to melt the continuous-feed electrodes for concurrently depositing material on the surface of the associated workpiece;
   wherein the electrode head includes a plurality of apertures which receive the associated multiple, continuous-feed electrodes; and
   a contact assembly in operative connection with the electrode head which receives the associated multiple, continuous-feed electrodes from the electrode head,
   a drive roll that continuously delivers the associated multiple, continuous-feed electrodes for movement through the electrode head and through the contact assembly in which the associated multiple, continuous-feed electrodes are melted to deposit material on the surface of the associated workpiece;
   the contact assembly comprises:
      a first contact bar and a second contact bar, wherein the first contact bar and the second contact bar absorb wear from melting the continuous-feed electrodes;
      the second contact bar includes a first flat side that includes a first set of grooves in which a groove of the set corresponds to at least one of a thickness of one of the associated multiple, continuous-feed electrodes and the groove allows for guided movement of one of the associated multiple, continuous-feed electrodes therein from the electrode head to deposit material on the surface of the workpiece;
      the first contact bar includes a first flat side; and
      an assembly connective means affixing the first contact bar to the second bar, wherein the first flat side of the second contact bar contacts the first flat side of the first contact bar encasing each of the associated multiple, continuous-feed electrodes between the first contact bar and the second contact bar within a respective groove of the set of grooves.

2. The welding device of claim 1 wherein
the first contact bar further comprises a second flat side opposite and parallel of the first flat side on the first contact bar; and
the second contact bar further comprises a second flat side opposite and parallel of the first flat side on the second contact bar.

3. The welding device of claim 2 which further comprises
the second flat side of the second contact bar includes a second set of grooves in which a groove of the set of grooves corresponds to at least one of the associated multiple, continuous-feed electrodes for each of the associated multiple, continuous-feed electrodes.

4. The welding device of claim 3 wherein
the first set of grooves in which each groove includes a width that is approximate in dimension to a first diameter for at least one of the associated multiple, continuous-feed electrodes; and
the second set of grooves includes a width that is approximate in dimension to a second diameter for at least one of the associated multiple, continuous-feed electrodes.

5. The welding device of claim 1 wherein
the first contact bar is constructed from a material selected from the group consisting of a copper, beryllium copper, copper tungsten, or an alloy of copper.

6. The welding device of claim 5 wherein
the second contact bar is constructed from a material selected from the group consisting of a steel, a copper, or a ceramic.

7. The welding device of claim 1 which further comprises
an insert incorporated into the first contact bar, wherein the insert includes a depth and a surface area that is approximate in dimension to a surface area of a portion of the first flat side that includes the first set of grooves.

8. The welding device of claim 7 wherein
the insert is constructed from a material selected from the group consisting of a copper, beryllium copper, copper tungsten, or an alloy of copper; and
the first contact bar is constructed from a material selected from the group consisting of a steel, a copper, or a ceramic.

9. The welding device of claim 1 wherein
the second bar is constructed from a first material and a second material, the second material includes the first set of grooves. an insert incorporated into the second contact bar, wherein the insert includes a depth and a surface area that is sized to include the set of grooves.

10. The welding device of claim 9 wherein
the second material is selected from the group consisting of a copper, beryllium copper, copper tungsten, or an alloy of copper; and
the first material is selected from the group consisting of a steel, a copper, or a ceramic.

11. The welding device of claim 1 which further comprises
a first insert incorporated into the first contact bar, wherein the first insert includes a depth and a surface area that is approximate in dimension to a surface area of a portion of the first flat side that includes the first set of grooves; and
the second contact bar is constructed from a first material and a second material, wherein the second material is more conductive than the first material.

12. The welding device of claim 11 wherein
the first insert is constructed from a material selected from the group consisting of a copper, beryllium copper, copper tungsten, or an alloy of copper;
the first contact bar is constructed from a material selected from the group consisting of a steel, a copper, or a ceramic;
the second material of the second contact bar is selected from the group consisting of a copper, beryllium copper, copper tungsten, or an alloy of copper; and
the first material of the second contact bar is selected from the group consisting of a steel, a copper, or a ceramic.

13. The welding device of claim 1 which further comprises an electrical conductor adapted to electrically connect the multiple, continuous-feed electrodes, wherein the electrical conductor is electrically connected to a welding power supply.

14. The welding device of claim 13, wherein
the contact assembly is adapted to receive the multiple, continuous-feed electrodes for establishing respective welding arcs based on the electrical conductor.

15. The welding device of claim 1, wherein
the assembly connective means includes a pressure spring clamp mechanism that secures the multiple-continuous-feed electrodes in between the first contact bar and the second contact bar.

16. An electrode head for a welding machine having one or more welding power sources and one or more electrode drives, comprising:
an electrode head body having a plurality of apertures adapted to convey a plurality of associated continuous feed electrodes that are consumable to which current is applied to melt the continuous-feed electrodes for depositing material onto an associated workpiece;
a contact assembly adapted to receive the plurality of associated continuous feed electrodes from the electrode head for establishing respective welding arcs, wherein the contact assembly is adapted to fixedly attach to the electrode head body;
a drive roll that continuously delivers the associated multiple, continuous-feed electrodes for movement through the electrode head and through the contact assembly in which the associated multiple, continuous-feed electrodes are melted to deposit material on the surface of the associated workpiece; and
the contact assembly comprises:
a first contact bar and a second contact bar;
the second contact bar includes a first flat side that includes a first set of grooves in which a groove of the set corresponds to one of a thickness of one of the associated multiple, continuous-feed electrodes and the groove allows for guided movement of one of the associated multiple, continuous-feed electrodes to deposit material on the surface of the workpiece;
the first contact bar includes a first flat side; and
an assembly connective means affixing the first contact bar to the second bar, wherein the first flat side of the second contact bar contacts the first flat side of the first contact bar encasing each of the associated multiple, continuous-feed electrodes between the first contact bar and the second contact bar within a respective grooved channel of the first set of grooves.

17. A welding device for depositing material on a surface of an associated workpiece, comprising:
an electrode head adapted to concurrently house an array of associated multiple, continuous-feed electrodes that are consumable in a spaced apart configuration to which current is applied to melt the continuous-feed electrodes for concurrently depositing material on the surface of the associated workpiece;
the electrode head includes a plurality of apertures adapted to receive the associated multiple, continuous-feed electrodes; and
a contact assembly coupled to the electrode head and adapted to receive the associated multiple, continuous-feed electrodes from the electrode head,
a drive roll that continuously delivers the associated multiple, continuous-feed electrodes for movement through the electrode head and through the contact assembly in which the associated multiple, continuous-feed electrodes are melted to deposit material on the surface of the associated workpiece;
the contact assembly comprises:
a first contact bar and a second contact bar;
the first contact bar includes a first flat side and the second contact bar includes a first flat side;
the first contact bar and the second contact bar are constructed from a first material;
at least one of the first contact bar incorporates an insert on the first flat side or the second contact bar incorporates an insert on the first flat side, the insert is constructed from a second material that is more conductive than the first material; and
an assembly connective means affixing the first contact bar to the second bar, wherein a first flat side of the second contact bar contacts the first flat side of the first contact bar encasing each of the associated multiple, continuous-feed electrodes between the first contact bar and the second contact bar within a respective groove of the set of grooves.

18. The welding device of claim 17 which further comprises
the first contact bar includes a second flat side opposite and parallel of the first flat side on the first contact bar; and
the second contact bar includes a second flat side opposite and parallel of the first flat side on the second contact bar.

19. The welding device of claim 17, wherein
at least one of the first flat side on the second contact bar or the insert incorporated into the second contact bar includes a first set of grooves in which a groove of the set corresponds to at least one of the associated multiple, continuous-feed electrodes; and
the first contact bar and the second contact bar encase each of the associated multiple, continuous-feed electrodes there between within a respective groove of the first set of grooves.

20. The welding device of claim 17, which further comprises at least one of the following:
the first contact bar includes connective means to couple the insert to the first contact bar;
the second contact bar includes connective means to couple the insert to the second contact bar;
the first contact bar includes connective means to couple the insert with the first contact bar and connective means to couple the second insert to the second contact bar.

21. The welding device of claim 17, wherein
the first material is selected from a group consisting of steel, copper, or ceramic; and
the second material is selected from a group consisting of copper, beryllium copper, copper tungsten, or an alloy of copper.

* * * * *